US008223837B2

(12) United States Patent
Sun et al.

(10) Patent No.: US 8,223,837 B2
(45) Date of Patent: Jul. 17, 2012

(54) LEARNING-BASED IMAGE COMPRESSION

(75) Inventors: Xiaoyan Sun, Beijing (CN); Feng Wu, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1348 days.

(21) Appl. No.: 11/851,653

(22) Filed: Sep. 7, 2007

(65) Prior Publication Data

US 2009/0067491 A1 Mar. 12, 2009

(51) Int. Cl.
*H04B 1/66* (2006.01)
*H04N 7/12* (2006.01)
*H04N 11/02* (2006.01)
*H04N 11/04* (2006.01)

(52) U.S. Cl. ............. 375/240.1; 375/240.08; 375/240.09

(58) Field of Classification Search .......... 375/240.01–240.06, 240.12–240.16, 375/240.26, 240.08–240.1; 348/700
See application file for complete search history.

(56) References Cited

U.S. PATENT DOCUMENTS

| | | | |
|---|---|---|---|
| 5,537,494 A | 7/1996 | Toh | |
| 5,668,897 A | 9/1997 | Stolfo | |
| 5,680,129 A | 10/1997 | Weinberger et al. | |
| 5,764,374 A | 6/1998 | Seroussi et al. | |
| 5,986,594 A | 11/1999 | Nakayama et al. | |
| 6,028,608 A * | 2/2000 | Jenkins | 345/619 |
| 6,658,159 B1 * | 12/2003 | Taubman | 382/240 |
| 6,775,415 B1 * | 8/2004 | Clausen et al. | 382/249 |
| 7,676,099 B2 * | 3/2010 | Bourge et al. | 382/232 |
| 2005/0131660 A1 | 6/2005 | Yadegar et al. | |
| 2009/0252431 A1 * | 10/2009 | Lu et al. | 382/255 |

FOREIGN PATENT DOCUMENTS

EP    0820198 A2    1/1998

OTHER PUBLICATIONS

Karayiannis, et al., "Image Compression Based on Fuzzy Algorithms for Learning Vector Quantization and Wavelet Image Decomposition", at <<http://md1.csa.com/partners/viewrecord.php?requester=gs&collection=TRD&recid=347811CI&q=&uid=790889562&setcookie=yes>>, ProQuest, 2007, pp. 1.

Shum, et al., "Survey of Image-Based Representations and Compression Techniques", at <<http://ieeexplore.ieee.org/iel5/76/27796/01239398.pdf?isNumber=>>, IEEE, vol. 13, No. 11, Nov. 2003, pp. 1020-1037.

(Continued)

*Primary Examiner* — Eleni Shiferaw
*Assistant Examiner* — Jing Sims
(74) *Attorney, Agent, or Firm* — Lee & Hayes, PLLC

(57) ABSTRACT

Learning-based image compression is described. In one implementation, an encoder possessing a first set of learned visual knowledge primitives excludes visual information from an image prior to compression. A decoder possessing an independently learned set of visual knowledge primitives synthesizes the excluded visual information into the image after decompression. The encoder and decoder are decoupled with respect to the information excluded at the encoder and the information synthesized at the decoder. This results in superior data compression since the information excluded at the encoder is dropped completely and not transferred to the decoder. Primitive visual elements synthesized at the decoder may be different than primitive visual elements dropped at the encoder, but the resulting reconstituted image is perceptually equivalent to the original image.

13 Claims, 8 Drawing Sheets

OTHER PUBLICATIONS

Taubman, "High Performance Scalable Image Compression with EBCOT", at <<http://www.eng.iastate.edu/ee528/SpecialTopics/JPEG2000/ebcott_ip.pdf>>, IEEE, vol. 9, No. 7, Jul. 2000, pp. 1158-1170.

William, "Digital Image Compression Based on Visual Perception and Scene Properties", at <<http://md1.csa.com/partners/viewrecord.php?requester=gs&collection=TRD&recid=0051139CI&recid=0051139EA&q=&uid=790889562&setcookie=yes>>, ProQuest, 2007, pp. 1.

Karayiannis, et al., "Image Compression Based on Fuzzy Algorithms for Learning Vector Quantization and Wavelet Image Decomposition", IEEE Transactions on Image Processing, vol. 7 Issue 8, Aug. 1998, pp. 1223-1230, 8 pgs.

Li, et al., "A New Image Compression Method Based on Primal Sketch Model", IEEE International Conference on Multimedia and Expo, Beijing, Jul. 2-5, 2007, pp. 1451-1454, 4 pgs.

Sun, et al., "Image Hallucination with Primal Sketch Priors", 2003 IEEE Computer Society Conference on Computer Vision and Pattern Recognition, Jun. 18-20, 2003, vol. 2, pp. 729-736, 8 pgs.

PCT International Search Report and the Written Opinion for Application No. PCT/US2008/075522, mailed on Jan. 30, 2009, 11 pgs.

Glenn, "Digital Image Compression Based on Visual Perception and Scene Properties", Copyright © 1993 by the Society of Motion Picture and Television Engineers, Inc., Presented at the 133rd SMPTE Technical Conference in Los Angeles, Oct. 27, 1991, pp. 392-397.

* cited by examiner

LEARNING-BASED IMAGE COMPRESSION

BACKGROUND

Compared with digital words or text, visual objects provide more perceivable information but also require more data for transmission and storage: "a picture is worth a thousand words." To facilitate uses of digital images, many image compression techniques have been developed for representing images compactly. Image compression is one of the most key technologies in the development of various multimedia applications.

Attempts have been made to develop compression techniques that rely on identifying and utilizing visual features within images to achieve high coding efficiency. Characteristics responsive to the human visual system (HVS) are incorporated into coding methods to try to remove some of the visual redundancy inherent in images and enhance visual quality of resulting images. Development of such coding schemes is greatly influenced by the availability and effectiveness of related techniques, such as edge detection and segmentation.

Recently, vision-related technologies have shown remarkable progress in hallucinating images with good perceptual quality. Attractive results have been achieved by newly presented vision technologies, such as feature extraction, image completion, and super-resolution. New ways to represent images are based on primitive visual elements, such as edge, color, shape, texture, and other visual features. Essentially, image compression schemes and vision systems face a similar problem, that is, how to represent visual objects in efficient and effective ways. The new ways to represent images are based on the possibility of applying certain vision technologies to compression systems to achieve perceptual quality rather than pixel-wise fidelity.

It is promising to significantly reduce visual redundancy on the basis of current transform-based coding schemes, exemplified by the success of applying image inpainting technologies to image coding. Moreover, compression systems greatly benefit when vision methods are introduced into data compression. On the one hand, as complete source images are available in compression systems, new vision technologies can fully exploit all the available source information. On the other hand, computer vision and graphic technologies may lead to new ways to explore visual redundancy in images during pursuit of good perceptual quality.

Although there is a large volume of knowledge on image compression, the majority of image coding techniques are based on transform methods. A conventional image compression system generally has an encoder module that consists of a prediction model, a linear transform (such as DCT or DWT), a quantizer, and an entropy encoder. There is a corresponding decoder. Such frameworks have been widely employed in many compression systems and standards, such as JPEG. Statistical redundancy inherent in images is utilized and is based on classical information theory that pursues compact representation of images.

Compression systems have also been developed by identifying visual features or applying learning models at the encoder and/or decoder to achieve high performance. Such coding systems typically embody an additional module for feature extraction or learning tools in the coding process. Conventional compression techniques assisted by the features (such as edge) or tools (such as neural networks) provide better adaptation and efficiency for data compression. Conventional learning-based compression schemes require the same training method and statistic models to be used on both encoder and decoder-sides. To meet this requirement, certain kinds of additional information that clarify the form of the operative model and related parameters need to be obtained on one side and transmitted to the other, which sacrifices the coding performance; or else generated on both sides by an identical procedure including model, parameter, input data, etc.—which greatly limits applicability.

SUMMARY

Learning-based image compression is described. In one implementation, an encoder possessing a first set of learned visual knowledge primitives excludes visual information from an image prior to compression. A decoder possessing an independently learned set of visual knowledge primitives synthesizes the excluded visual information into the image after decompression. The encoder and decoder are decoupled with respect to the information excluded at the encoder and the information synthesized at the decoder. This results in superior data compression since the information excluded at the encoder is dropped completely and not transferred to the decoder. Primitive visual elements synthesized at the decoder may be different than primitive visual elements dropped at the encoder, but the resulting reconstituted image is perceptually equivalent to the original image.

This summary is provided to introduce the subject matter of learning-based image compression, which is further described below in the Detailed Description. This summary is not intended to identify essential features of the claimed subject matter, nor is it intended for use in determining the scope of the claimed subject matter.

DETAILED DESCRIPTION

Overview

Figure 1:
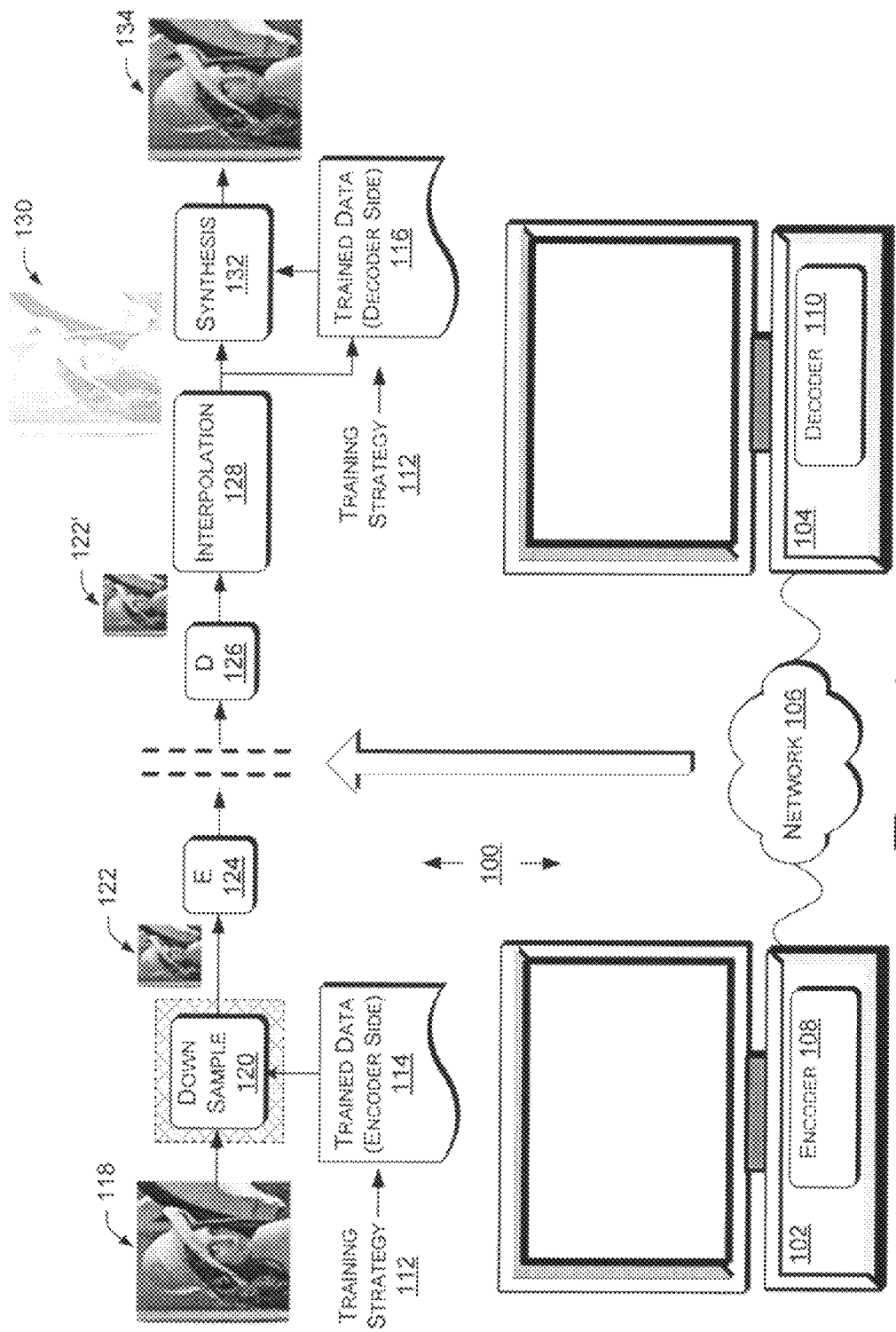
FIG. 1 is a diagram of an exemplary learning-based image compression system.

This disclosure describes learning-based image compression. Exemplary systems and methods implement a perception-based image compression framework by incorporating "visual elements-based learning" into mainstream image coding frameworks. Certain primitive visual image data can be dropped at an encoder to greatly increase the data compression ratio. Neither the dropped data nor instructions for restoring the dropped data need to be sent to the decoder. Rather, the decoder synthesizes the dropped data "from scratch" based on its own understanding of primitive visual elements, resulting in a reconstituted image that is perceptually equivalent to the original image.

By employing low-level visual knowledge learned independently from different sets of training images at the encoder and decoder, an exemplary image compression system excludes ("drops") some kinds of information during encoding so that less information needs to be coded and transmitted. Then, the decoder synthesizes the dropped information using its own learned knowledge rather than decompressing a distilled version of the dropped data or following instructions received from the encoder. Thus, the encoder and decoder are decoupled with respect to the data dropped at the encoder and synthesized at the decoder. The decoder synthesizes the dropped data using its own independently acquired visual knowledge after receiving only a simplified (sub-sampled) and compressed version of what remains of the original image after some primitive visual elements have been removed by the encoder to reduce data. This exemplary system provides a significant improvement in data compression ratios over conventional compression techniques. Visually striking quality can also be achieved even at very low bit rates, for example, 0.16 bits per pixel (bpp) for a color image.

Terms used herein include "primal sketch region," which is explained in detail further below and refers to conventionally determined 2-dimensional areas of an image and intensity changes by gray-level information across them. "Primitive patch" refers to a filtered version of the image information in a primal sketch region, for example, in a 9×9 pixel size. Thus, the same primal sketch region can have multiple associated primitive patches, depending on the state of the image when the filter was applied and the type of filtering applied. For example, a low resolution or low-pass filtered primitive patch, a high resolution or high-pass filtered primitive patch, a distorted primitive patch, and a differential primitive patch can all be associated with the same primal sketch area. "Primitive visual element" is a term of art that refers generally to graphics elements used as building blocks for creating images. Thus, a "primitive patch" can be described more generally as a type of primitive visual element. As used herein, primal sketch-based primitive patches are used as the primitive visual elements in the exemplary systems and techniques described herein.

Exemplary System

FIG. 1 shows an exemplary system 100 that performs image compression by learning primitive visual elements. In the exemplary system 100, a first computing device 102 is communicatively coupled with a second computing device 104 via a network 106, such as the Internet. The computing devices 102 and 104 may be computers or other devices with a processor, memory, and data storage. In FIG. 1, the first computing device 102 hosts an encoder 108 and the second device hosts a decoder 110. In other implementations each computing device 102 may typically include both an encoder 108 and a decoder 110.

At the encoder 108 and decoder 110, the same training strategy 112 is applied, but to different sets of training images to obtain decoupled knowledge on the encoder-side and the decoder-side. That is, the encoder-side trained data 114 is different from the decoder-side trained data 116.

An original image 118 input at the encoder 108 is analyzed for droppable information using the encoder-side trained data 114 and down-sampled 120 into a simplified image 122. The encoder-side trained data 114 enables the encoder 108 to know which primitive visual elements can be dropped from the original image 118. The simplified image 122 is then encoded via a standard and/or conventional encoder 124 and transmitted over the network 106.

At the decoder-side, the received image data is first decoded via a standard and/or conventional decoder 126 (for example, that complements the conventional encoder 124). The decoded image 122 corresponds to the simplified image 122 that was encoded. Interpolation 128 is applied to reconstitute an interpolated version of the image 130 that lacks the image data dropped at the encoder 108. Then, during synthesis 132, the decoder 110 uses it's own learned knowledge of primitive visual elements maintained at the decoder-side trained data 116 to restore missing and/or rudimentary primitive visual elements to the interpolated image 130 in order to reconstruct a perceptually plausible version of the original image 118.

Exemplary Encoder

Figure 2:
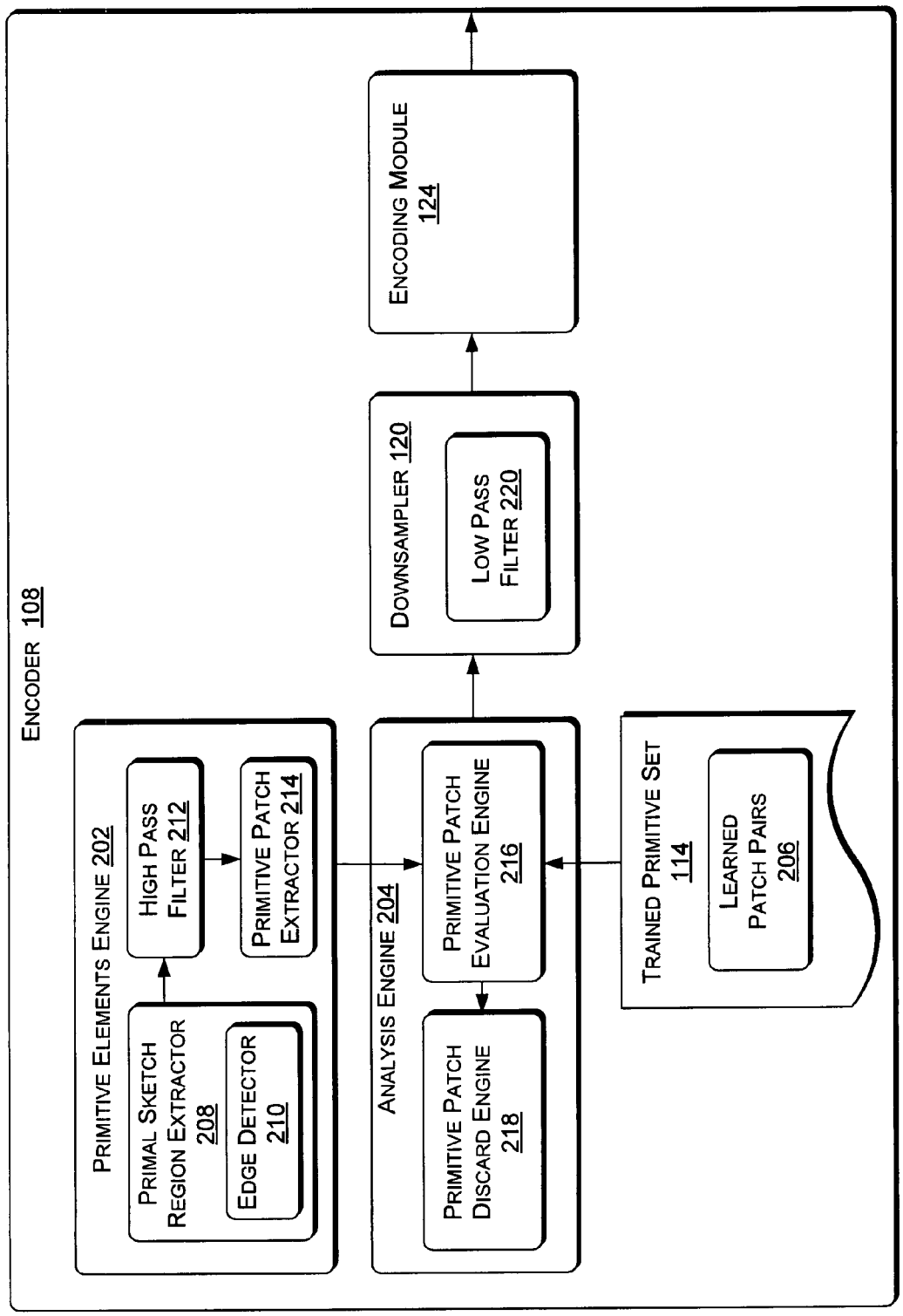
FIG. 2 is a block diagram of an exemplary encoder.

FIG. 2 shows one implementation of the encoder 108 of FIG. 1, in greater detail. The illustrated implementation is only one example configuration, for descriptive purposes. Many other arrangements of the components of an exemplary encoder 108 are possible within the scope of this described subject matter. Such an exemplary encoder 108 can be executed in hardware, software, or combinations of hardware, software, firmware, etc.

The illustrated encoder 108 includes a primitive elements engine 202, an analysis engine 204 that is coupled to the primitive elements engine 202 and to the trained primitive set 114 with its learned patch pairs 206, a downsampler 120, and an encoding module 124, which may be a conventional encoder.

The primitive elements engine 202 determines primal sketch regions of an image and extracts primitive patches from the primal sketch regions. Accordingly, the primitive elements engine 202 includes a primal sketch region extractor 208 that is based on edge detection. A high-pass filter 212 is applied to the primal sketch regions to produce corresponding primitive patches extractable by the primitive patch extractor 214.

The analysis engine 204 determines which primitive patches can be discarded because they can be synthesized at the decoder 110. Hence, a primitive patch evaluation engine 216 determines if a primitive patch can be dropped because it can be deduced or approximated from the trained primitive set 114. If the primitive patch matches knowledge in the trained primitive set 114, then a primitive patch discard engine 218 drops the primitive patch from encoding and/or leaves a low-resolution version of the primitive patch for encoding.

The downsampler 120 includes a low-pass filter 220 to sub-sample the original image 118 minus its primitive patch data that has been dropped, thus creating the down-sampled image 122. The down-sampled image 122 is then subjected to compression by a standard or conventional encoder 124. The compressed image data is then ready for transmission to the decoder 110. As the simplified image 122 has less information than the original image 118, the encoding module 124 is able to use a lower bit rate to represent the image.

Exemplary Decoder

Figure 3:
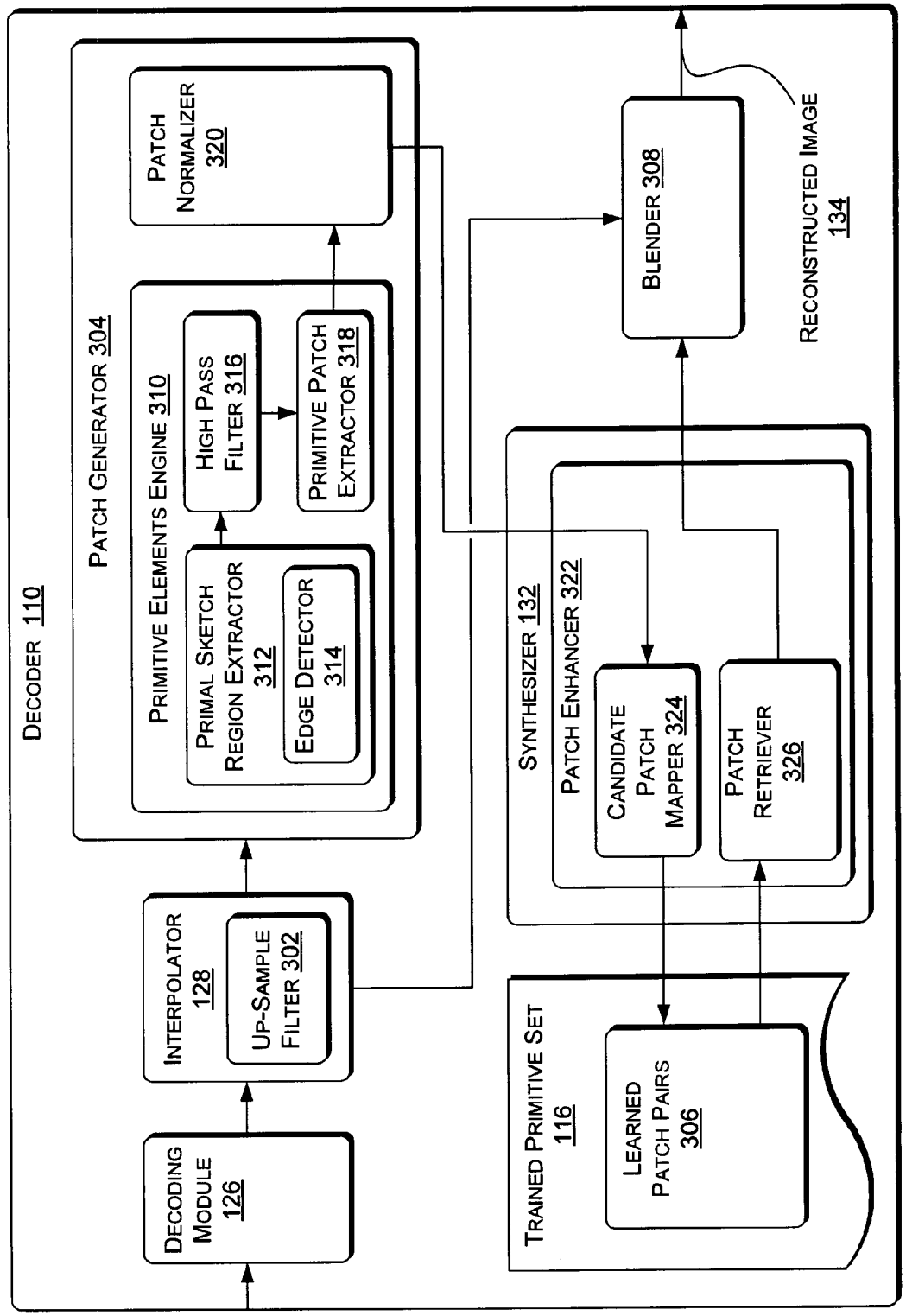
FIG. 3 is a block diagram of an exemplary decoder.

FIG. 3 shows one implementation of the decoder 110 of FIG. 1, in greater detail. The illustrated implementation is only one example configuration, for descriptive purposes. Many other arrangements of the components of an exemplary decoder 110 are possible within the scope of this described subject matter. Such an exemplary decoder 110 can be executed in hardware, software, or combinations of hardware, software, firmware, etc.

The illustrated decoder 110 includes a standard or conventional decoding module 126 to decompress the coding technique applied by the standard or conventional encoding module 124 of the encoder 108. The decoder 110 also includes an interpolator 128 including an up-sample filter 302, a patch generator 304, a synthesizer 132 communicatively coupled with the decoder-side trained primitive set 116, and a blender 308 to mix the synthesized visual elements with the interpolated image 130 to obtain a reconstructed image 134 that is perceptually equivalent to the original image 118.

The patch generator 304 further includes a primitive elements engine 310 similar to that of the encoder 108, including a primal sketch region extractor 312 and edge detector 314, a high-pass filter 316 for producing a primitive patch corresponding to each primal sketch region, and a primitive patch extractor 318. The patch generator 304 also includes a patch normalizer 320.

The synthesizer 132 includes a patch enhancer 322 to reconstitute the primal sketch regions with primitive visual elements that result in a perceptually equivalent result even though the new primitive visual elements might be different from those dropped at the encoder 108. A candidate patch mapper 324 receives a low-resolution patch from the normalizer 320 and uses the received patch as criterion for performing a search for a matching or similar low-resolution patch candidate in the learned patch pairs 306 of the trained primitive set 116. For example, the candidate patch mapper 324 may apply an approximate nearest neighbor (ANN) search to find a "match" among the low-resolution members of the learned patch pairs 306. In one implementation, when a candidate is found, the patch retriever 326 obtains a differential signal mate of the candidate patch. The blender 308, as pointed out, blends retrieved patches with the interpolated image 130 to obtain the reconstructed image 134.

Decoupling the Encoder and Decoder From Each Other

The exemplary decoupling of encoder 108 and decoder 110 with respect to dropped information can be achieved because both encoder 108 and decoder 110 independently understand the image as a collection of primitive visual elements. In one implementation, the encoder 108 and decoder 110 use equivalent learning strategies on different training sets of images to develop respective trained sets of primitive visual element "patches." A given decoder may use slightly different primitive patches when reconstructing an image than the corresponding primitive patches that were dropped at the encoder before compression. However, because the exemplary learning strategy for developing the different trained sets is the same at both encoder and decoder, the corresponding but different primitive patches at encoder and decoder are "interchangeable" in obtaining a perceptually equivalent macroscopic result.

In the exemplary system, an image reconstructed at the decoder with primitive patches that are not literally the same as those dropped at the encoder, is nonetheless perceptually similar or equivalent to the original image at the encoder. In other words, the visual variation between original image and reconstituted image is below a threshold of the human visual system (HVS) to discern a difference, even though a great deal of data may have been dropped at the encoder and then synthesized at the decoder with primitive patches that are not literally the same as those dropped.

In one implementation, to develop the trained knowledge, an exemplary training engine that is used independently at encoder and decoder simulates a simplified and compressed version of each image in a training set—i.e., simulates each image as it would be sent from the encoder and received at the decoder in compressed form. That is, the learning engine simulates the distortion inherent in the process of lossy image compression, for each image in the training set. This is done to develop low-resolution exemplars of primitive patches that well represent the actual primitive patches as they will appear in data received at the decoder. These low-resolution versions are then paired with differential versions of the same primitive patch, which can be added to the corresponding low-resolution primal regions of the image to provide a result comparable to that of the original image.

The learning engine first maps primal sketch regions along visual edges in each (low-resolution) distorted training image. For each primal sketch region in the distorted and low-resolution version of the image, the learning engine generates the low resolution and differential pair of primitive patches, both corresponding to the same primal sketch region. During decoding, for each primal sketch region encountered in the distorted version of the image received from the encoder, the decoder searches for a candidate matching low-resolution version of a suitable primitive patch among its trained set of primitive patch pairs. Then, the differential member of the same primitive patch pair is invoked for synthesizing the dropped information in the reconstructed version of the image.

In general, it would be very difficult or even impossible to decouple the knowledge used at encoder and decoder for conventional compression techniques. For example, vector quantization learns the statistical characteristics of the source signal in terms of either pixel correlations or coefficient distribution, and its codebook is normally organized according to occurrence probability of a sort mapping from high-dimension vectors to a certain low-dimension one. For a typical vector quantization-based compression scheme, the same codebooks should be used at both encoder and decoder, and indices have to be correctly transmitted to the decoder to get exact low-dimension vectors for reconstruction. Otherwise, any mismatch between codebooks and any transmitted error on indices causes a large problem for reconstruction and consequently damages the decoded image.

In contrast, the exemplary system described herein is based on learning primitive visual elements instead of the statistical characteristics of pixels or coefficients. Although semantic contents may vary broadly from one image to another, without exception images contain many primitive visual elements (such as edge, color, shape, and texture). If the unit of primitive visual elements is of a proper size, their variation patterns are relatively independent of image contents. Therefore, provided that the primitive visual elements for training are rich enough, no matter what images are selected as training set, the exemplary learning strategy achieves similar or even the same knowledge at encoder and decoder.

In the exemplary system, selected primitive visual elements should be sparse enough in high-dimension space so that their variation patterns can converge rapidly into many compact clusters. In this manner, one of the samples can be selected as representative of one cluster without causing significant distortion, especially in visual quality.

How does the decoder know which element of knowledge should be used for enriching each primitive region? One conventional solution is to send indices from encoder-side to decoder-side in a manner similar to that of vector quantization. However, in the exemplary system, the encoder has little idea of the detail of knowledge (e.g., the element order of codebook) used in the decoder. Furthermore, knowledge used in the encoder and in each decoder could be different from each other. These factors make transmitting conventional indices unsuitable or even untenable. In the exemplary system, the problem is addressed by encoding the simplified version of the input image, in which the primitive regions that have the dropped data are treated as the indices. When the corresponding primitive regions in the simplified image have a strong correlation with the knowledge used in the encoder and decoders, each decoder is able to locate the corresponding element from its trained knowledge for a given primitive region. Thus, no additional indices are needed-the stripped down image received from the encoder is its own index.

Operation of the Exemplary System

The concept of primitive visual elements has been discussed extensively in the literature of computer vision. A primitive visual element is a graphics element used as a building block for creating images. Image primitive elements, which aim for direct insertion into the visual attributes of an image, consist of individual graphic entities. Such a primitive element can be a line, a vector, a texture, or other visual feature. Within the scope of visual features, each feature can be further classified as a general feature (e.g., color, texture, shape, etc.) or a domain-specific feature that is application-dependent, such as directed for rendering human faces. In fact, some of the primitive features have been utilized in image compression that is based on statistical principles, for example, compression by vector quantization, matching pursuit, edge-based schemes, etc.

In order to present a generic compression approach, the exemplary system 100 prefers the general primitives that are retrieved by visual pattern analysis and represented by image exemplars. On one hand, primitive elements, such as lines, junctions, edges, and so forth, are robust in terms of perceptual quality. On the other hand, not all primitive elements can be well studied in order to preserve a desired quality. The next section describes how to analyze these issues.

Problem Statement

Consider an image set $\{I_k\}_{k=1}^{\infty}$, each member of which takes values in a finite alphabet $\Lambda(|\Lambda|)=256$. Using a traditional compression system, $I_k$ can be compressed into a code $C_k$ by an encoding function $f:\Lambda^n \to \{0,1\}^*$, i.e. $C_k=f(I_k)$, where $\{0,1\}^*$ represents 0-1 sequences. On the decoder-side, a decoding function $g:\{0,1\}^* \to \Lambda^n$ is applied to present a reconstruction $\tilde{I}_k$, $\tilde{I}_k=g(C_k)$. Thus, a traditional compression processing function, which is composed of an encoder and a decoder, can be formulated as $\phi: I_k \to \tilde{I}_k$, i.e. $\tilde{I}_k=\phi(I_k)=g \cdot f(I_k)$. Then the encoding rate distortion optimization is obtained as in Equation (1):

$$\min(D(I_k,\tilde{I}_k)+\lambda R_k), \qquad (1)$$

where $\lambda$ is a weighted factor, $R_k$ is the length of $C_k$ in bits and $D(I,\tilde{I}_k)$ is the distortion between I and $\tilde{I}_k$ determined by a fidelity measure D. When some sort of knowledge is involved in compression, the encoding function is defined as in Equation (2):

$$f_i \equiv f_i: \Lambda^n \xrightarrow{L\{\zeta,\Omega_i\}} \{0,1\}^*, \qquad (2)$$

where L( ) is a learning process, $\zeta$ represents a type of primitive element, and $\Omega_i$ is one subset of image set $\{I_k\}_{k=1}^{\infty}$ labeled by i. Correspondingly, the reconstructed image is obtained by $\tilde{I}_k=g(C_k|L(\zeta,\Omega_j))$, where the function g is shown in Equation (3):

$$g_j \equiv g_j: \{0,1\}^* \xrightarrow{L\{\zeta,\Omega_i\}} \Lambda^n. \qquad (3)$$

In typical learning-based coding schemes, the learned knowledge $L(\zeta,\Omega)$ is required to be the same among decoders so that the decoders can provide a unique reconstruction for an input image. Furthermore, the learned knowledge should also be identical at both encoder and decoder to ensure correct decoding and equivalent quality as well.

In the exemplary system 100, as different training sets can be used in the encoder 108 and decoder 110, the encoder 108 reconstructs image $\tilde{I}_k^i$ as in Equation (4):

$$\tilde{I}_k^i = g_i(C_k|L(\zeta,\Omega_i)) \qquad (4)$$

while the decoder 110 creates a reconstruction $\tilde{I}_k$ as in Equation (5):

$$\tilde{I}_k^j = g_j(C_k|L(\zeta,\Omega_j)). \qquad (5)$$

The compression distortions at encoder 108 and decoder 110 are $\overline{D}(I_k,\tilde{I}_k^i)$ and $\overline{D}(I_k,\tilde{I}_k^j)$, respectively, measured by quality assessment matrix $\overline{D}$. Then, the rate-distortion optimization is obtained as in Equation (6):

$$\arg_t \min(\overline{D}(I_k,\tilde{I}_k^t)+\lambda R_k), \qquad (6)$$

where $t \in \{i,j\}$. Accordingly, a target is to find a proper type of primitive elements $\zeta$ subject to Equation (6) to make the encoder 108 and decoders 110 have similar distortions though their reconstructed images could be different in terms of pixel values.

Exemplary Selected Primitive Elements

In one implementation, primal sketch-based primitive patches are used as the primitive elements in the exemplary system 100.

Primal sketch, a known technique, can provide primitive elements for the exemplary system 100. The primal sketch model is an important contribution in computer vision, made first made by D. Marr, in Vision, W. H. Freeman and Company, 1982. The primal sketch model constitutes a symbolic or token representation of image intensity variations and their local geometry. According to the definition of primal sketch given in the Marr reference, the process of generating a primal sketch involves the following two steps. First, a classical visual edge is extracted as the zero-crossing position of a Laplacian or Gaussian-filtered image. Then the edge-segment descriptors, bars, and blobs are grouped into units, associated with properties such as length, width, brightness, and position in the image to form the primal sketches. Compared with an edge model, the primal sketch model refers not only to the two-dimensional geometry of images but also to the intensity changes by relevant gray-level information across them. It makes the primal sketch model a rich representation of images.

Moreover, recent progress shows that primal sketches can be well-represented by examples, and the dimensionality of image primitives, such as primal sketch, is intrinsically very low. Thus, it is possible to represent the primal sketches of natural images by a limited number of examples. For example, it has been shown that primal sketches of an image can be learned from those of other generic images. Given a low-resolution image, a set of candidate high frequency primitives can be selected from the trained data based on low frequency primitives to enhance the quality of the up-sampled version. Thus, in one implementation, the exemplary system 100 selects primal sketch-based primitive elements and includes a coding framework that degrades edge-related regions, to be later recovered by primal sketch-based learning.

Exemplary Primal Sketch-based Primitive Patch

Generally, during compression, an original image I(x) is locally filtered with a low-pass filter $G_L(x)$ of unity integral, accompanied with quantization noise q(x). It can be modeled as in Equation (7):

$$\tilde{I}(x)=I(x)*G_L(x)+q(x). \qquad (7)$$

The degraded information of signal I(x) during compression is the difference between I(x) and $\tilde{I}(x)$ which could be estimated as in Equation (8):

$$d=I(x)-\tilde{I}(x) \approx I(x)*G_H(x)+q'(x). \qquad (8)$$

where $G_H(x)$ and $q'(x)$ correspond to local high-pass filtering and quantization noise. This approximation, although theoretically not precisely accurate, is yet practical. At high and medium quality levels, quantization noise has a relatively low effect on the difference signal: there is some similarity between a histogram of its compressed version and that of its high-pass filtered version. Thus, the distortion caused by compression at high quality levels can be simulated as the high frequency components of the original signal, despite quantization noise.

Furthermore, the distortion, especially large distortion, caused by compression mainly focuses on high frequency regions of an image. Accordingly, compression tends to cause a considerable truncation of high frequency energy in primal sketch regions along visual edges, while introducing relatively few effects in low frequency regions of the image. As humans are more sensitive to high-contrast intensity changes, such a type of distortion would result in visible artifacts and thus degrade the perceptual quality of the entire image.

Figure 4:
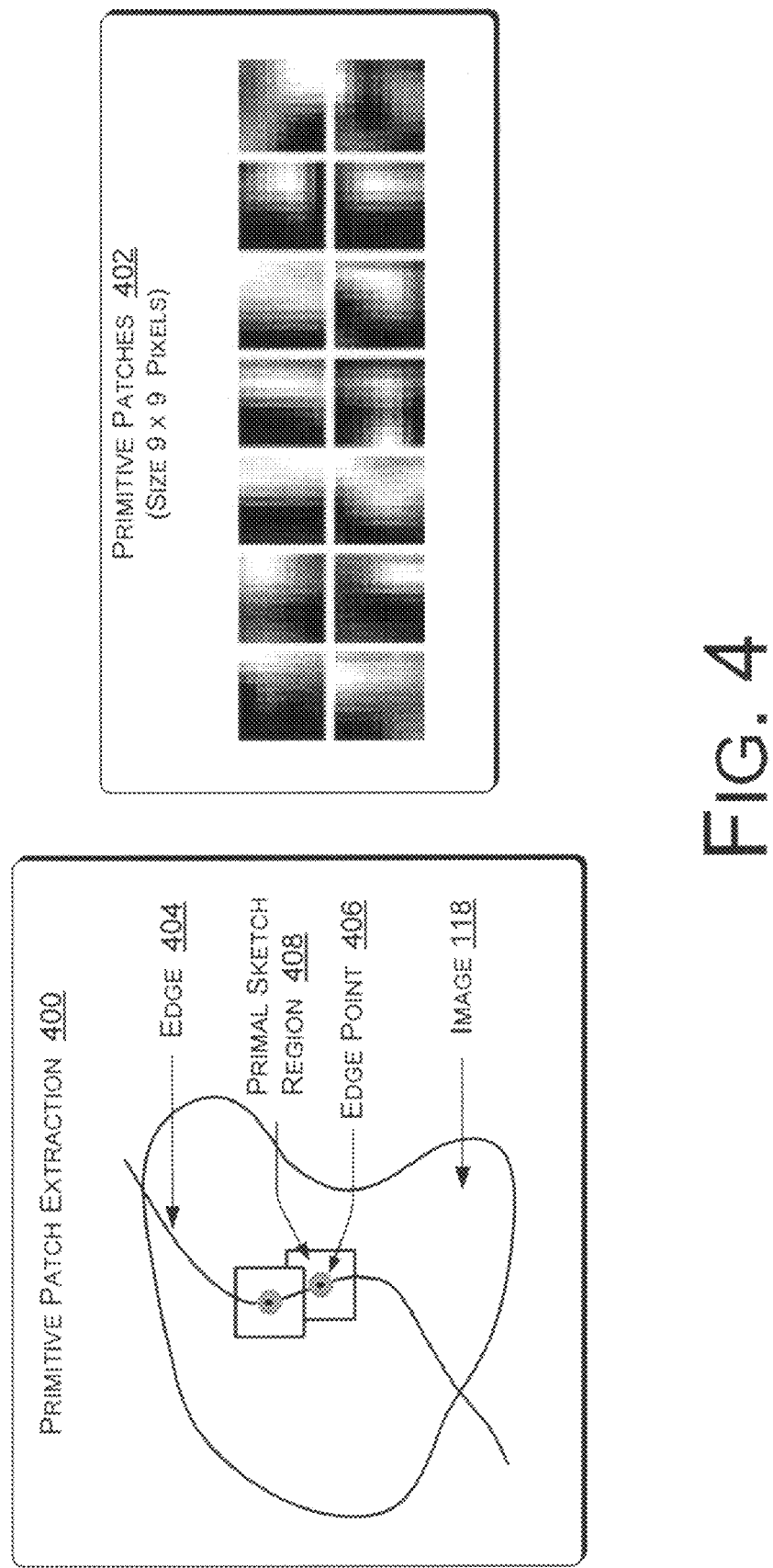
FIG. 4 is a diagram of exemplary primitive patch extraction.

So, it is useful to exploit the high frequency signal of primal sketch regions. FIG. 4 shows an example of primitive patch extraction 400. In one implementation of the exemplary system 100, primitive elements are edge-centered N×N patches 402, referred to herein as "primitive patches" 402. Edges 404 for generating the primitive patches are extracted by convolving image signal $I(x)$ with the derivative of a Gaussian function $\Psi(x;\sigma,\theta)$ at scale $\sigma$ and orientation $\theta$, as shown in Equation (9):

$$E(x)=I(x)*\Psi(x;\sigma,\theta). \qquad (9)$$

An edge point 406 is identified by finding the local maximum in the magnitude of the response. Then, as shown in FIG. 4, the primal sketch region extractor 208 extracts the primal sketch regions 408 along the edge points whose local maximum is recognized as an edge. After high-pass filtering, the "patch" containing the high frequency signal of a primal sketch region 408 is treated as a primitive patch 402. Some examples of primitive patches of size 9×9 pixels are also depicted in FIG. 4.

Exemplary Learing-based Patch Mapping

Building on the above analysis, exemplary learning-based mapping studies the high-frequency components both of original primal sketch regions 408 and of their distorted versions. The idea is to build a generic relationship between the original primitive patch 402 and its recovered version. Trained data 114 that contain pairs of patches 206 are obtained from a set of generic images.

Figure 5:
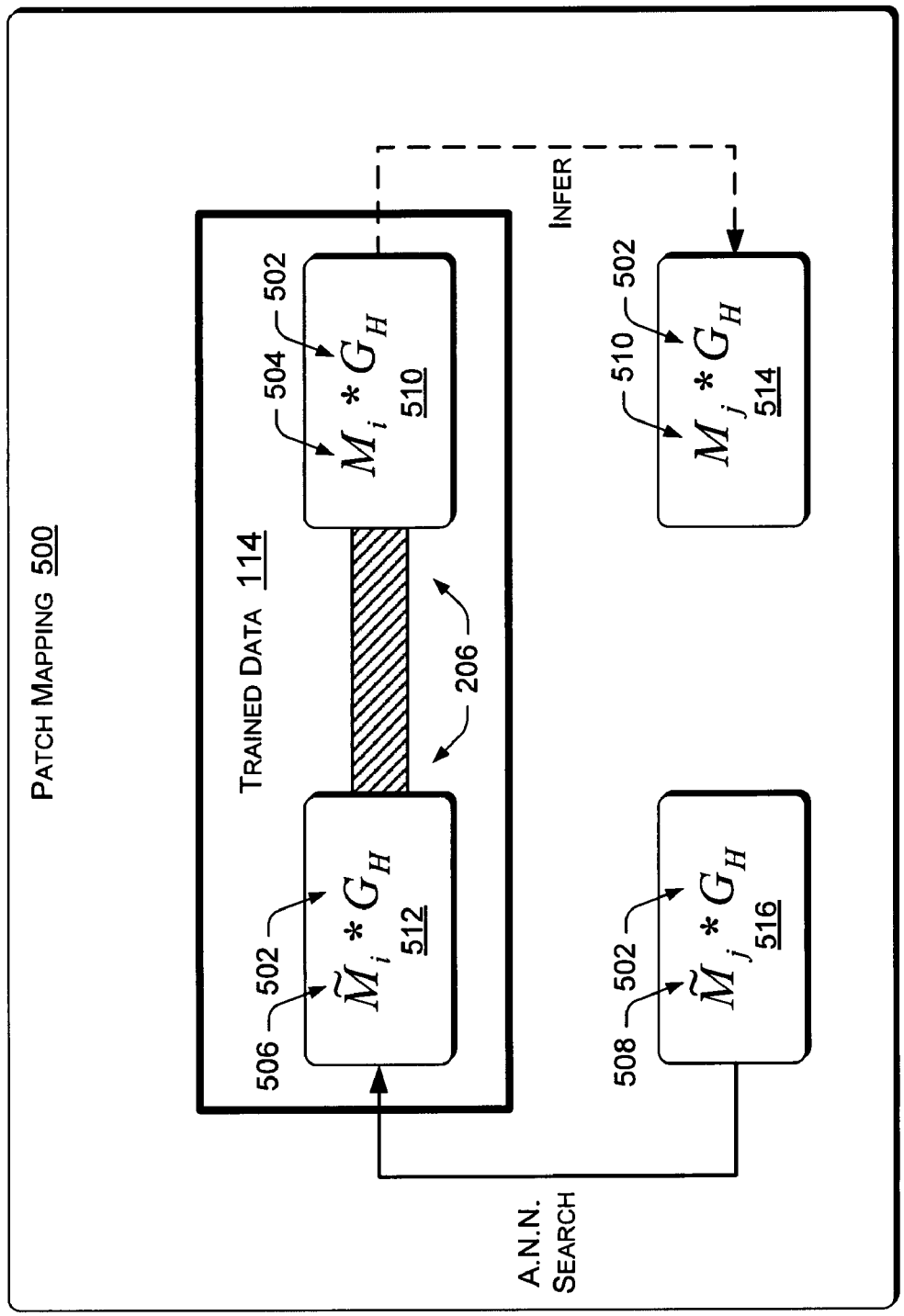
FIG. 5 is a diagram of exemplary patch mapping.

FIG. 5 shows exemplary patch mapping 500. The candidate patch mapper 324 can carry out this process. In FIG. 5, $G_H$ is a high-pass filter 502. The variables i and j denote two different images. $M_i$ 504 is an original primal sketch region 408 of image i, and $\tilde{M}_i$ 506 is its distorted version. Given a distorted patch $\tilde{M}_j$ 508 of input image j, the goal is to use the similarity between primitive patches and their distorted versions, i.e., as derived from training images (e.g. $M_i * G_H$ 510 and $\tilde{M}_i * G_H$ 512 of image i), to infer the missing high frequency signal $M_j * G_H$ 514 according to the undistorted patch $M_j$ 510.

An important aspect of this patch mapping process 500 is the definition of similarity. This similarity should be able to measure the relationship between primitive patch $M_i$ 504 and its distorted version $\tilde{M}_i$ 506 in an image i. Meanwhile, it is also necessary to measure the relationship between primitive patches from different images, such as $\tilde{M}_i * G_H$ 512 and $\tilde{M}_j * G_H$ 516. The metric should be able to preserve recognizable features between an original patch 504 and its distorted version 512 in one image, and at the same be able to be applied across patches of different images.

For image patches generally, it may be hard to find a proper metric. But since patch primitives in contour regions are of low dimensionality, it is possible to represent the possible primitive patches 402 by an affordable number of examples and further create appropriate patch mapping.

Let $N=M * G_H$ denote an original primitive patch 402, and N' be its most similar patch in terms of pixel value. We use the metric $e(N)=\|N-N'\|/\|N\|$ to evaluate the effectiveness of patch mapping 500. For a given match error e, the hit rate h represents the percentage of test data whose match errors are less than e. Receiver Operating Characteristic (ROC) curve is adopted to show the relationship between e and h. At a given match error, a high hit rate indicates a good generalization of the training data, which indicates that the training data are of low dimensionality.

Figure 6:
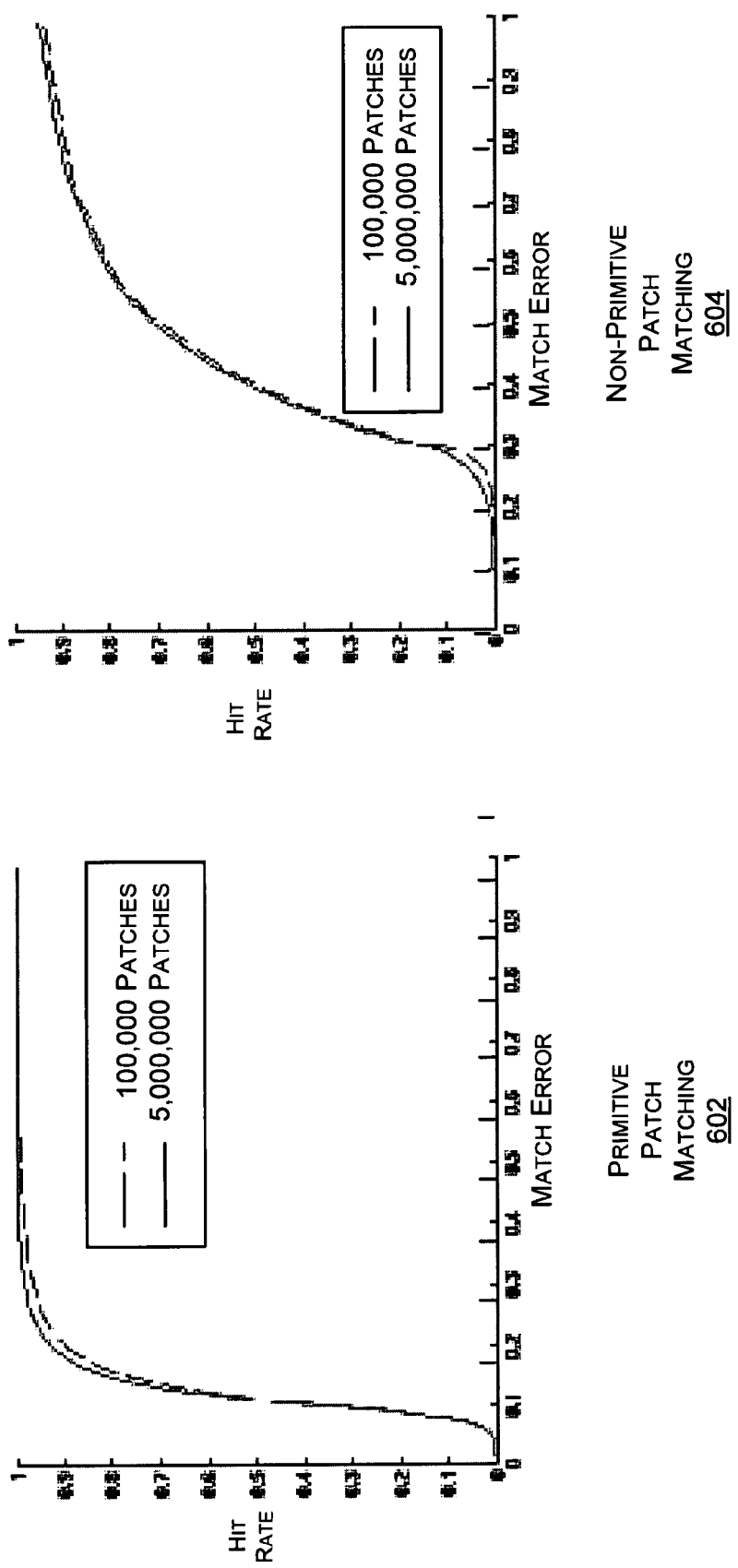
FIG. 6 is a diagram of exemplary hit rate versus matching error for exemplary primitive patch matching versus generic non-primitive patch matching.

In one implementation, patches of size 9×9 pixels are extracted along contours to form primitive patch samples. The same number of 9×9 pixel patches is uniformly selected from the test images as non-primitive samples. Two ROC curves generated based on the primitive samples 602 and the non-primitive samples 604 are shown in FIG. 6. It can be observed that primitive patches 402 at primal sketch regions 408 lead to a higher hit rate under the same match error and same training set size, compared with patches outside primal sketch regions 408. For example, when the training set contains about $5 \times 10^6$ pairs 206 of patches, the match error of primitive patches 402 is less than 0.2 for 90% the patches. However, the match error is about 0.5 or 70% for non-primitive patches under the same training set size. Therefore, in one implementation, the mapping process is performed only in primal sketch regions 408. Moreover, primal sketch regions 408 contain more high frequency information. Thus, visual quality is significantly improved when these patches can be recovered well.

Exemplary Training Engine (Primitive Patch Learning)

Figure 7:
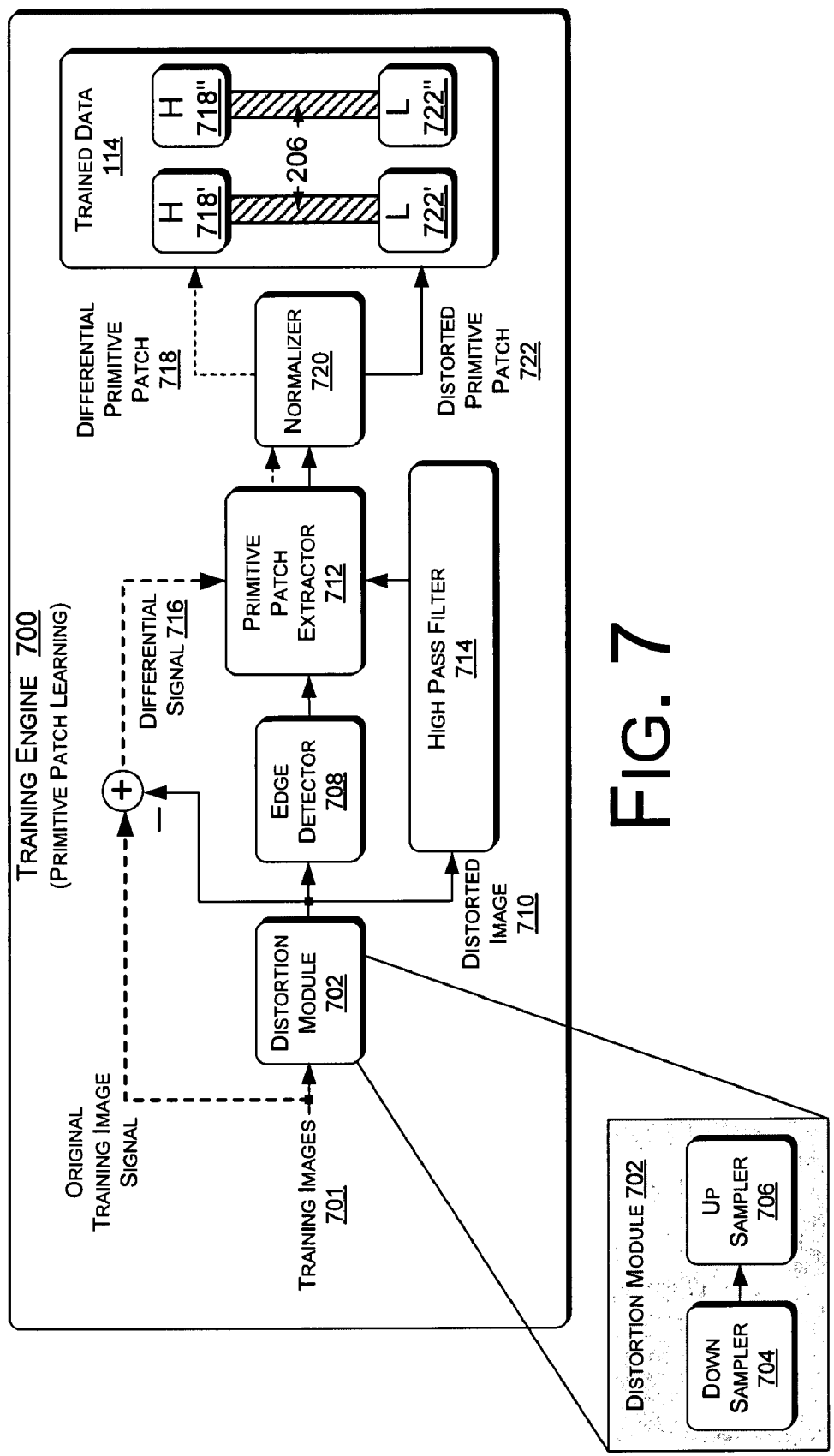
FIG. 7 is a block diagram of an exemplary training engine.

Based on the above analyses, learning-based patch mapping 500 is applied to develop the relationships between primitive patches 402. FIG. 7 shows an exemplary training engine 700 for primitive patch learning. The illustrated implementation is only one example configuration, for descriptive purposes. Many other arrangements of the components of an exemplary training engine 700 are possible within the scope of this described subject matter. Such an exemplary training engine 700 can be executed in hardware, software, or combinations of hardware, software, firmware, etc.

In FIG. 7, the dashed lines indicate a signal of an original training image 701, while the solid lines indicate a signal of the distorted training image 710. Given an input training image 701, a distortion module 702 simulates the process of lossy compression. For example, in one implementation, a distortion module 702 includes a down-sample filter 704 followed by an up-sample filter 706. Then, an edge detector 708, such as an orientation energy-based edge detector, is applied to the reconstructed distorted image 710.

According to the detected edge information, the primal patch extractor 712 determines primal sketch regions 408 of both the distorted image (input from the high-pass filter 714) and the differential signal 716 that represents the difference between the distorted image 710 and the original training image 701. In this training, a distorted primitive patch 722 and the differential primitive patch 718 at the same image position are treated as a primitive pair 206 in the following process. After the normalizer 720, each pair 206 of primitive patches is categorized into several categories, e.g., by an edge classifier, according to the edge type and orientation of the distorted primitive patch 722, and correspondingly stored into the trained set 114. Subsequently, certain clustering techniques may be applied to shrink the size of the trained set 114 to a desirable level.

Specifically, let $\tilde{M}_i$ and $\tilde{M}_j$ denote the primitive patches 722 of high-pass filtered distorted images $\tilde{I}_i * G_H$ and $\tilde{I}_j * G_H$, $\sigma_i$ and $\sigma_j$ are the standard deviations with respect to the luminance distributions in $\tilde{I}_i * G_H$ and $\tilde{I}_j * G_H$, respectively. At primal sketch regions 408, if a normalized primitive patch 722' of a distorted image $\tilde{I}_i * G_H$ is similar to a normalized primitive patch 722 of another distorted image $\tilde{I}_j * G_H$, the relationship between the corresponding normalized original primitive patches 402 of image $I_i * G_H$ and $I_j * G_H$ can be learned well by the exemplary learning-based training method. In other words, if primitive patch $\tilde{M}_i / \sigma_i$ is similar to $\tilde{M}_j / \sigma_j$, the decoder 110 can deduce the primitive patch $M_j / \sigma_j$ from $M_i / \sigma_i$ a by the mapping given in Equations (10) and (11), the latter primitive patch $M_i / \sigma_i$ being found in the trained data 116.

$$\tilde{M}_i / \sigma_i \leftrightarrows \tilde{M}_j / \sigma_j \qquad (10)$$

$$M_i / \sigma_i \leftrightarrows M_j / \sigma_j \qquad (11)$$

An advantage of the exemplary patch mapping 500 is that it provides a very natural means of specifying image transformations. Rather than selecting between different filters, the exemplary patch mapping 500 simply works by being supplied with an appropriate exemplar which can directly index the trained set 116 or be used directly as a search criterion, without having to perform additional or in-between processing.

Variations

In correspondence with the training strategy exemplified by the training engine 700 in FIG. 7, the exemplary encoder 108 adopts additional down-sample filtering before the conventional image encoding module 124. The down-sample filter 120 can be different from the down-sampler 704 in the training engine 700, but the down-sample ratio should be the same. At the encoder 108, an original image 118 is down-sampled into 1/s size by a low-pass filter 220. Then a traditional compression method, such as standard JPEG, can be utilized at the encoding module 124 to gain a compression ratio r on the down-sampled image 122. Therefore, such an overall compression ratio is $1/(s^2 r)$.

At the decoder 110, the input bit stream is first decoded by a traditional decoding module 126. The reconstructed low-resolution signal 122' is interpolated to the original size by an up-sample filter 302, which can be different from the up-sampler 706 in the training engine 700. Then, the learning-based patch mapping 500 occurs in the decoder's synthesizer 132 to infer the dropped high frequency information at primal sketch regions 408 caused by the low-pass filtering 220 in the encoder 108. At the decoder 110, the primal sketch region extraction 312 for the mapping process 500 is the same as that of the learning process in the training engine 700. Additionally, the candidate patch mapper 324 at the decoder 110 can use an approximate nearest neighbor (ANN) search to locate a potential candidate for each extracted primitive patch in the trained set 116.

In one implementation, the procedure of mapping and synthesis only affects the luminance component of reconstructed images 134. That is, in one implementation, the chroma components stay unchanged in the decoder's synthesizer 132. In addition, for primal sketch regions 408, the selected primitive patches may be partly covered or attenuated to reduce the boundary effect between patches. During blending, determining the pixel values in overlapped regions is an issue to be decided. In one implementation, the exemplary decoder 110 uses a straightforward average operator to deal with the pixel values. For each pixel x in primal sketch regions 408, the blended value of x, i.e. r(x), is achieved by Equation (12):

$$r(x) = \alpha \cdot v(x) + \beta \cdot \frac{1}{n} \sum_{i=1}^{n} p_i(x), \qquad (12)$$

where v(x) is the value of the up-sampled pixel value of x, n is the number of overlapped primitive patches at pixel x, p(x) is the data value of $i^{th}$ primitive patch, and $\alpha$ and $\beta$ are weighted factors. For non-primal sketch regions, the up-sampled values can be used directly in presenting the final reconstructed image 134.

Exemplaiy Trained Data Sets

In one implementation, the exemplary system 100 uses a set of generic images including both JPEG standard test images and Kodak test images. Weighted averaging with factor matrix is used in the down-sampling module 120, and bi-cubic interpolation is applied for up-sampling 128. The JPEG compression method is utilized to compress the down-sampled low-resolution images. The ANN tree search algorithm is introduced to the process of patch mapping 500.

In one implementation of the training process, input images are first pre-filtered by a Gaussian filter for noise suppression. All extracted pairs 206 of primitive patches are classified into 48 classes (three types at sixteen orientations) according to the type and orientation information given by the orientation energy detection scheme, as shown in Equation (13):

$$W = \frac{1}{16} \begin{bmatrix} 1 & 2 & 1 \\ 2 & 4 & 2 \\ 1 & 2 & 1 \end{bmatrix} \qquad (13)$$

Referring back to FIG. 1, different training sets can be used to evaluate the performance of the exemplary system 100. In one implementation, the variables $\alpha$ and $\beta$ in Equation (12) are 1.0 and 1.2, respectively. Given an input image 118, the image 118 is ⅓×⅓ down-sampled and then compressed by JPEG at quality level 75 at the encoder-side. At the decoder-side, the reconstructed low-resolution image 122' is up-sampled by bi-cubic interpolation. Edges are detected on the up-sampled version of the image 130. Using the trained set of primitives 116, the final reconstructed image 134 is obtained after patch mapping 500 at primal sketch regions 408.

For one example trained set 114, two images of size 1536×1024 pixels are learned. In another trained set 114', only one image of size 3008×2000 pixels is learned. Although the training images in these two trained sets are quite different, each of them contains rich primitive elements. Consequently, the final size of learned knowledge is approximately 11.7 Mb in the first trained set 114 and 63.3 Mb in the second trained set 114' because the training image 701 for the second trained set 114' contains more primitive elements.

The size of learned knowledge is controllable by using a clustering algorithm. In the exemplary system 100, the size of the trained set 114 is not a concern because the learned knowledge does not need to be transmitted at all. Thus, the cost of the knowledge is merely the local data storage, which is often not a concern in modern computing devices with ample storage space. In addition, since the learned knowledge 206 can be organized by hierarchical categories, the actual data size of the trained set 114 usually has limited influence on decoding speed. In the exemplary system 100, although the training images employed in different trained sets 114 and 114' are quite different from each other, the exemplary system 100 provides similar performance with knowledge learned in different trained sets as long as the knowledge is obtained by the same learning process, i.e., training strategy 112.

The exemplary system 100 achieves very good visual quality at low bit-rate compression. The average bits-per-pixel (bpp) rate is approximately 0.16 after compression but the visual quality is still excellent from a human perceptual standpoint at such low bit rates. As compared with JPEG and JPEG2000 compression paradigms, the exemplary system 100 often presents more natural contours, more vivid detail, and much clearer structure. Further, the overall visual quality of each picture is excellent at such low bit rates.

In one implementation, the exemplary system 100 uses sets of knowledge 114 obtained by learning from uncompressed original images, while in the encoder 108 and decoder 110 the primal sketch regions 408 are extracted on the distorted images 122. This mismatch on primal sketch patches, although tolerable, can be changed in other implementations of the exemplary system 100 to increase efficiency. For example, better performance can be achieved when the knowledge 114 is learned from the same distorted images from which the primal sketch regions 408 are extracted in the encoder 108 and decoder 110.

Exemplaly Method

Figure 8:
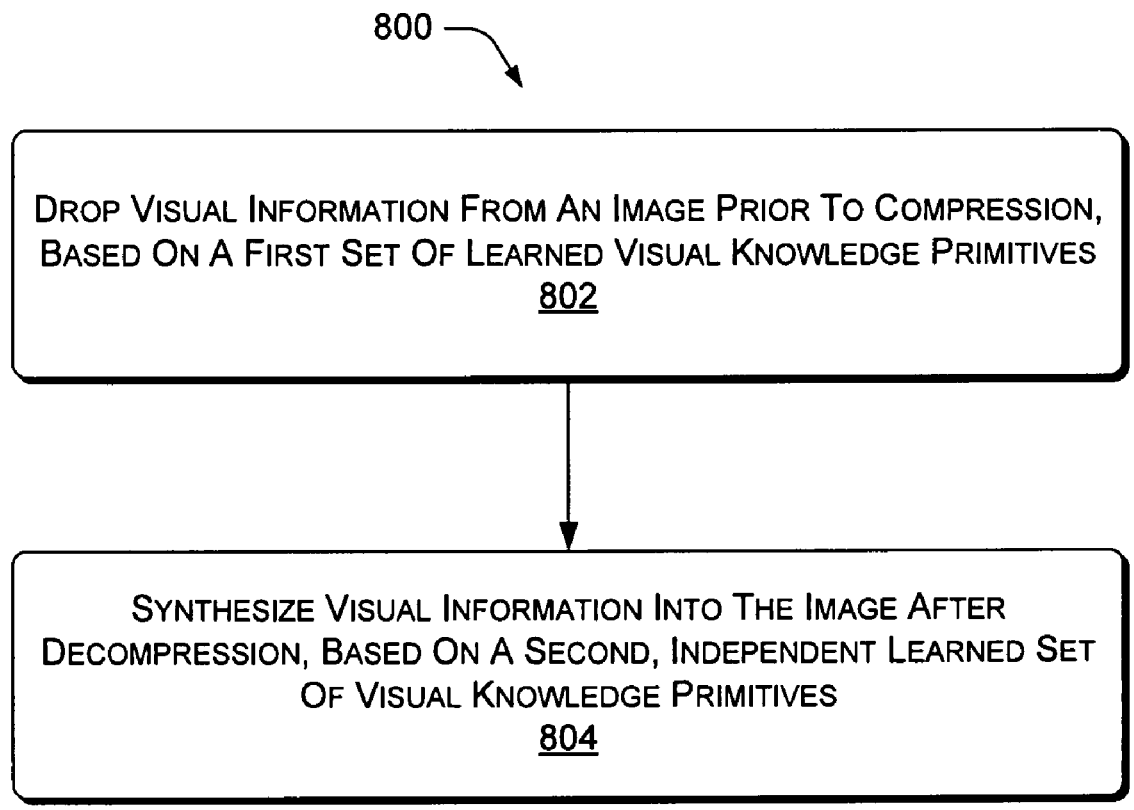
FIG. 8 is a flow diagram of an exemplary learning-based image compression method.

FIG. 8 shows an exemplary method 800 of learning-based image compression. In the flow diagram, the operations are summarized in individual blocks. The exemplary method 800 may be performed by hardware, software, or combinations of hardware, software, firmware, etc., for example, by components of the exemplary encoder 108, decoder 110, and training engine 700.

At block 802, visual information is dropped from an image prior to compression, based on a first set of learned visual knowledge primitives. In one implementation, the method includes detecting a similarity between visual information in the image and information in the set of primitive visual elements. After removing the visual information from the image, the image is compressed. Further, the method can include determining primal sketch regions in the image, and then filtering the primal sketch regions to obtain primitive patches, e.g., with a high-pass filter. The primitive patches are removed from the image if the primitive patches are similar to or can be deduced from visual elements in the set of primitive visual elements.

At block 804, visual information is synthesized into the image after decompression, based on a second, independent learned set of visual knowledge primitives. Moreover, the second set of primitive visual elements is learned from a different set of training images than the first set of primitive visual elements. However, the two sets of primitive visual elements are derived via a same or similar learning strategy.

An exemplary decoding stage that includes the synthesizing may also include other steps in support of the synthesizing. For example, the method may include finding a primal sketch region in the decompressed and interpolated image, extracting a distorted primitive patch from the primal sketch region, finding a similar distorted primitive patch in the second set of primitive visual elements, retrieving a differential primitive patch that has been paired with the found distorted primitive patch in the set, and blending the differential patch with the primal region in the interpolated image to obtain a reconstructed version of part of the original image.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention caimeded is:

1. A method, comprising:
under control of one or more computing systems comprising one or more processors,
detecting a similarity between visual information in an image and information in a first set of primitive visual elements for creating images;
determining primal sketch regions in the image, the primal sketch regions including multiple associated primitive patches;
filtering the primal sketch regions to obtain primitive patches of the multiple associated primitive patches;
removing the primitive patches from the image when the primitive patches are associated with the first set of primitive visual elements;
compressing the image
receiving the compressed image;
decompressing the compressed image; and
synthesizing the visual information that was removed, wherein the synthesizing uses a second set of primitive visual elements for creating images, wherein:
the first set of primitive visual elements is learned from first training images and the second set of primitive visual elements is learned from second training images that are different from the first training images, and
learning the first set of primitive visual elements and learning the second set of primitive visual elements use same learning strategy.

2. The method as recited in claim 1, further comprising one of storing the compressed image or transmitting the compressed image as a bitstream.

3. The method as recited in claim 1, wherein learning a set of primitive visual elements further comprises:
applying distortion to each original training image to obtain a distorted image simulating a compressed version of the original training image;
subtracting the distorted image from the original training image to obtain a differential image;
detecting visual edges in the distorted image;
based on the visual edges, determining primal sketch regions of the distorted image and of the differential image;
filtering the primal sketch regions of the distorted image to obtain distorted primitive patches; and
filtering the primal sketch regions of the differential image to obtain differential primitive patches, wherein the set of primitive visual elements includes primitive patch pairs, each primitive patch pair including one distorted primitive patch and one differential primitive patch, each pair corresponding to a primal sketch region.

4. The method as recited in claim 3, wherein synthesizing the visual information includes:
finding a primal sketch region in the decompressed and interpolated image;
extracting a distorted primitive patch from the primal sketch region;
finding a distorted primitive patch in the second set of primitive visual elements;

retrieving the differential primitive patch from the pair associated with the found distorted primitive patch; and blending the differential primitive patch at the corresponding primal sketch region in the interpolated image to obtain a reconstructed version of part of the image.

5. The method as recited in claim 3, wherein the distorted primitive patch comprises a low-resolution patch from low-pass filtering and the differential primitive patch comprises information to reconstruct a part of the image corresponding to the distorted primitive patch.

6. The method as recited in claim 1, wherein removing visual information and compressing the image are performed by an encoder; and wherein decompressing the compressed image and synthesizing the visual information that was removed are performed by a decoder.

7. The method as recited in claim 1, further comprising:

down-sampling the image minus the removed visual information prior to compressing the image; and interpolating the image by up-sampling after decompressing the image.

8. The method as recited in claim 1, wherein the visual information removed before compression of the image is decoupled from the visual information synthesized after decompression of the image, the decoupling comprising excluding from one or more decoders the visual information removed at an encoder.

9. A method, comprising:

under control of one or more computing systems comprising one or more processors, learning a first set of primitive visual element pairs from a first group of training images via a learning strategy, wherein the first set is used to exclude information from an image prior to data compression; and learning a second set of primitive visual element pairs from a second group of training images via the learning strategy, wherein:

the second set is used to synthesize the excluded information for reconstituting the image after data decompression, a decoder possessing the second set does not use knowledge of the primitive visual element pairs in the first set that are used to exclude image information at an encoder, and the image reconstituted via the second set is equivalent to the image from which the information was excluded via the first set.

10. The method as recited in claim 9, wherein the primitive visual element pairs of the first set are different than the primitive visual element pairs of the second set.

11. The method as recited in claim 9, wherein the image and the reconstituted image are constructed at least in part from different primitive visual elements and are equivalent to each other.

12. A system, comprising:

memory;

one or processors coupled to the memory;

an encoder possessing a first set of primitive visual knowledge elements for excluding information from an image prior to compression; and a decoder possessing a second set of primitive visual knowledge elements for synthesizing excluded information into the image after decompression, wherein:

the decoder does not use knowledge of the primitive knowledge elements in the first set at the encoder; and the encoder does not use knowledge of the primitive visual knowledge elements in the second set at the decoder, wherein the encoder strips high-pass image information from primal sketch regions of the image prior to compression based on the first set; and wherein the decoder senses missing high-pass information at the primal sketch regions after decompression and provides the missing information from the second set.

13. The system as recited in claim 12, wherein the information supplied from the second set is different on a pixel-wise basis than the high-pass information stripped by the encoder; and wherein the information from the second set is equivalent to the high-pass information stripped by the encoder.

* * * * *